(12) United States Patent
Kashyap et al.

(10) Patent No.: US 7,162,408 B2
(45) Date of Patent: Jan. 9, 2007

(54) SUBSCRIBER IDENTIFICATION MODULE (SIM) EMULATOR

(75) Inventors: Shawn Kashyap, Seattle, WA (US); Jason Frazier, Redmond, WA (US); Neville Bowers, West Hartford, CT (US)

(73) Assignee: Microsoft Corporation, Redmond, WA (US)

( * ) Notice: Subject to any disclaimer, the term of this patent is extended or adjusted under 35 U.S.C. 154(b) by 538 days.

(21) Appl. No.: 10/736,971

(22) Filed: Dec. 15, 2003

(65) Prior Publication Data

US 2005/0131671 A1 Jun. 16, 2005

(51) Int. Cl.
*G06F 9/455* (2006.01)
(52) U.S. Cl. ........................................ 703/24; 455/411
(58) Field of Classification Search .................. 703/24, 703/21; 455/410, 411; 380/247, 250; 235/382; 707/9
See application file for complete search history.

(56) References Cited

U.S. PATENT DOCUMENTS 6,430,410 B1 * 8/2002 Staber ........................ 455/423
6,799,155 B1 * 9/2004 Lindemann et al. .......... 703/24
6,973,329 B1 * 12/2005 Hamberg .................. 455/554.2

OTHER PUBLICATIONS

"Potential fraudulent usage in mobile telecommunications networks," by Lin, Yi-Bing; Rao, Herman, C.-H., Proceedings of the Int'l Conference on Telecommunications v 2 2002, Mobile Computing, IEEE Transactions on, vol.: 1, Issue: 2, Apr.-Jun. 2002, pp. 123-131.

* cited by examiner

*Primary Examiner*—Albert W. Paladini
(74) *Attorney, Agent, or Firm*—Merchant & Gould P.C.

(57) ABSTRACT

Embodiments of the present invention relate to methods, systems, and computer-readable media for emulating a Subscriber Identification Module (SIM). SIM emulation comprises reading configuration data representing one or more characteristics of the SIM. Execution of the emulation is then initiated. A SIM command is received from a Radio Interface Layer (RIL) to access resources of the SIM. The SIM command is handled in a manner consistent with operation of the SIM based on the configuration data. Data related to the SIM command and handling of the command is logged.

39 Claims, 8 Drawing Sheets

US 7,162,408 B2

SUBSCRIBER IDENTIFICATION MODULE (SIM) EMULATOR

TECHNICAL FIELD

The present invention relates generally to the field of computer software and more particularly to a software development tool for testing applications that use a Subscriber Identification Module (SIM).

BACKGROUND OF THE INVENTION

A wide variety of mobile computing devices such as cellular telephones, pagers, Personal Digital Assistants (PDAs), and others are commonly in use. Software available for use on these mobile devices includes a wide range of applications including games, phonebooks, calendars, email, web browsers, and others. These applications, when executed on the mobile device frequently utilize resources of a Subscriber Identification Module (SIM) in the mobile device. The SIM is a "smart card" device consisting of memory and a processor that performs various functions such as performing security functions and maintaining a file system for storing information.

For example, a phonebook application may store entries in the file system of the SIM. The SIM will allow access to these entries only to authorized applications. If authorized, an application may update the contents of the file system to, for example, store a new phonebook entry. The SIM, through its security functions, may also allow an authorized application to read and/or update a user's Personal Identification Number (PIN).

Testing of applications that use the resources of the SIM generally depends upon testing the applications with the SIM that will be in use with the device upon which the application will be executed. Typically, these tests use a SIM device connected with a computing device, such as a personal computer, upon which the applications are developed and tested. In other cases, the applications are tested on mobile devices that use a SIM.

However, obtaining and keeping SIMs active can be very expensive such that testing applications with SIMs is costly. Moreover, since most SIMs allow only limited access to some features, such as reading or updating a PIN, a SIM can be used only a limited number of times to test those features which increases the overall cost of each test. Additionally, different types of SIMs may be used in various mobile devices. Therefore, thorough testing with SIMs results in the software vendor needing to obtain a large number of SIMs of many different types. It is with respect to these considerations and others that the present invention has been made.

SUMMARY OF THE INVENTION

In accordance with the present invention, the above and other problems are solved by methods and systems for emulating a Subscriber Identification Module (SIM) device. Using these methods and systems, an application for use on a mobile device may be tested using an emulated SIM rather than a real SIM. The SIM emulator can be set up, through configuration data, to behave in a manner consistent with the actual SIM being emulated. Applications can be run and tested using the SIM emulator in the same manner they would use a real SIM. Additionally, the SIM emulator may log data during the test and simulate SIM errors to further aid in testing and debugging of applications.

In accordance with other aspects, the present invention relates to a method of emulating a Subscriber Identification Module (SIM). The method comprises reading configuration data representing one or more characteristics of the SIM. Execution of the emulation is then initiated. A SIM command is received from a Radio Interface Layer (RIL) to access resources of the SIM. The SIM command is handled in a manner consistent with operation of the SIM based on the configuration data. Data related to the SIM command and handling of the command is logged.

In accordance with still other aspects, the present invention relates to a system to emulate a Subscriber Identification Module (SIM). The system includes a processor and a memory coupled with and readable by the processor. The memory contains a sequence of instructions that, when executed by the processor, cause the processor to read configuration data representing one or more characteristics of the SIM. The processor then initiates execution of the emulation. A SIM command is received from a Radio Interface Layer (RIL) to access resources of the SIM. The SIM command is handled in a manner consistent with operation of the SIM based on the configuration data. Data related to the SIM command and handling of the command is logged.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Embodiments of the present invention relate to emulating a Subscriber Identification Module (SIM). As will be described below, SIM emulation may be performed in various environments. For example, SIM emulation may be performed within a real mobile device. Alternatively, the SIM emulation may be performed as part of an emulation of a mobile device wherein the functions of various components of the actual mobile device are emulated along with the SIM emulation. Of course, various combinations of real components and emulated components are also possible.

Figure 1:
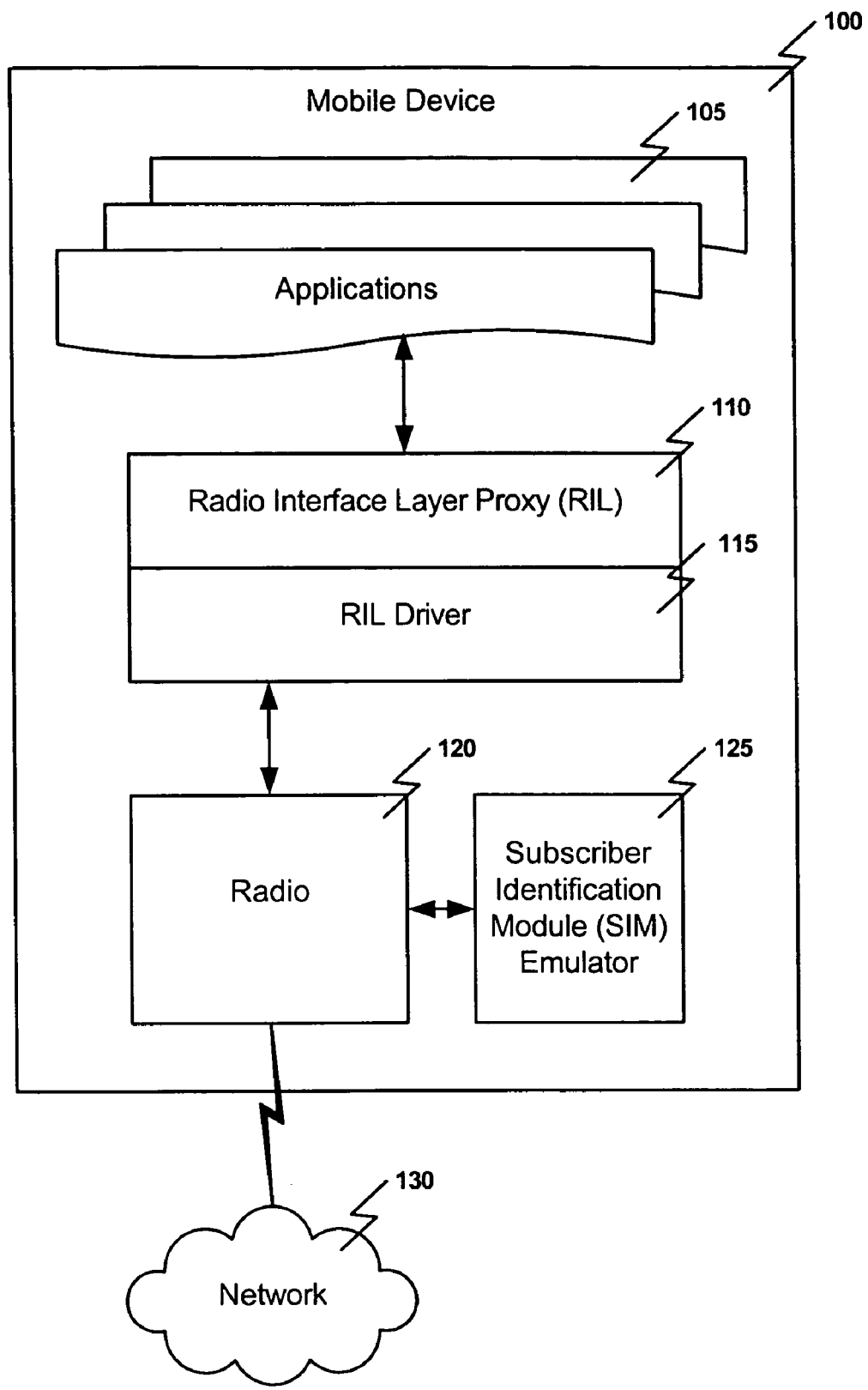
FIG. 1 illustrates functional components of a mobile device on which an embodiment of the present invention may be implemented.

FIG. 1 illustrates some of the components of a mobile device on which embodiments of the present invention may be implemented. In this example, real mobile device 100 is illustrated. The mobile device 100 includes one or more applications 105, a Radio Interface Layer (RIL) proxy 110, a RIL driver 115, a radio 120, and a Subscriber Identification Module (SIM) emulator 125.

The applications 105 may include one or more of a variety of possible software applications that may be executed on the mobile device 100 such as a phonebook, calendar, web browser, games, etc. These applications may be executed on the mobile device during development of the application for testing and debugging. During execution, the applications 105 interface with the RIL proxy 110.

The RIL proxy 110 is a software layer which exposes a set of RIL Application Program Interfaces (APIs) to the applications 105. RIL driver 115, along with the RIL proxy 110, provides communction between applications 105 and the radio 120, e.g., through the RIL 110 the applications may access the radio 120. The radio 120 in turn provides a connection with a wireless network 130, such as a cellular network through which the mobile device 100 may communicate with other devices. In this embodiment, the "radio" is defined as a transmitter and receiver for connecting with and providing communications over a wireless network.

Also, the radio 120 provides a connection between the applications 105 and the SIM emulator 125. The SIM emulator 125 may consist of software stored in memory of the mobile device 100 and executed by the mobile device 100. Alternatively, the SIM emulator 125 may reside in memory of and be executed on another device such as a personal computer connected with the mobile device 100 via appropriate cabling or other types of connections. In either case, the SIM emulator 125 provides the functionality of a real SIM. In this manner, the applications 105 may be tested without the cost and trouble of using a real SIM.

Details of the functions performed by the SIM emulator 125 will be discussed below with reference to FIGS. 5–7. Generally speaking, a SIM provides various file system and authentication functions for the applications 105. In operation, the SIM emulator 125 provides the same functionality to the applications 105 as a real SIM would. In order to achieve this, the SIM emulator 125 first reads configuration data. This configuration data may be in the form of an eXtensible Mark-up Language (XML) file, text file, or other format. The configuration data represents one or more characteristics of the real SIM being emulated. For example, the configuration data may comprise one or more parameters representing operating characteristics of a real SIM such as a time delay for performing a function associated with the SIM command. In another example, the configuration data may comprise one or more data files such as phonebook entries to be stored in a file system of the SIM.

In one embodiment, the SIM emulator 125 may comprise a software routine with hard coded functions for maintaining a file system, maintaining a security system, and responding to SIM commands. Configuration data represents values to be used for variables in these routines in places where characteristics and behavior vary between different types of SIMs.

After reading the configuration data, the SIM emulator 125 initiates execution of the emulation. Emulation of the SIM comprises performing functions consistent with those performed by the real SIM as indicated by the configuration data. For example, the SIM emulator 125 may emulate a file system including one or more data files containing data from the configuration data. Additionally, the SIM emulator 125 may provide a SIM security system for maintaining and handling access to files in the file system as well as providing access to a Personal Identification Number (PIN). In another example, the SIM emulator 125 may provide a SIM toolkit including typical SIM programs for causing messages to be displayed or sounds to be played upon the occurrence of a specified event.

During execution of the emulation, the SIM emulator may receive from the RIL 110 a SIM command to access resources of the SIM. For example, the SIM emulator 125 may receive from the RIL a SIM command to read or write data in the file system. Therefore, in the case of a write command, receiving the SIM command may further comprise receiving data associated with the SIM command such as the data to be written to the file system.

The SIM emulator 125 handles the SIM command in a manner consistent with operation of the real SIM based on the configuration data. For example, handling the SIM command may comprise returning a response code such as the real SIM would return. The return code may be based on accessing data in the SIM file system. Therefore, handling the SIM command may also comprise returning response data associated with the response code such as data read from the file system in response to successful completion of handling a SIM read command.

The SIM emulator 125 may also log data related to the SIM command and handling of the command. For example, the SIM emulator 125 may record the SIM command and the response code. In some cases, the response data and other data associated with handling the SIM command may also be recorded. The logged data may later be accessed to aid in debugging of applications being tested.

Finally, the SIM emulator may also simulate SIM errors based on the configuration data. That is, the configuration data may indicate one or more errors to be produced by the SIM emulator randomly, at specified times, or in response to specified events in order to more thoroughly test the ability of the application being tested to handle such errors.

Figure 2:
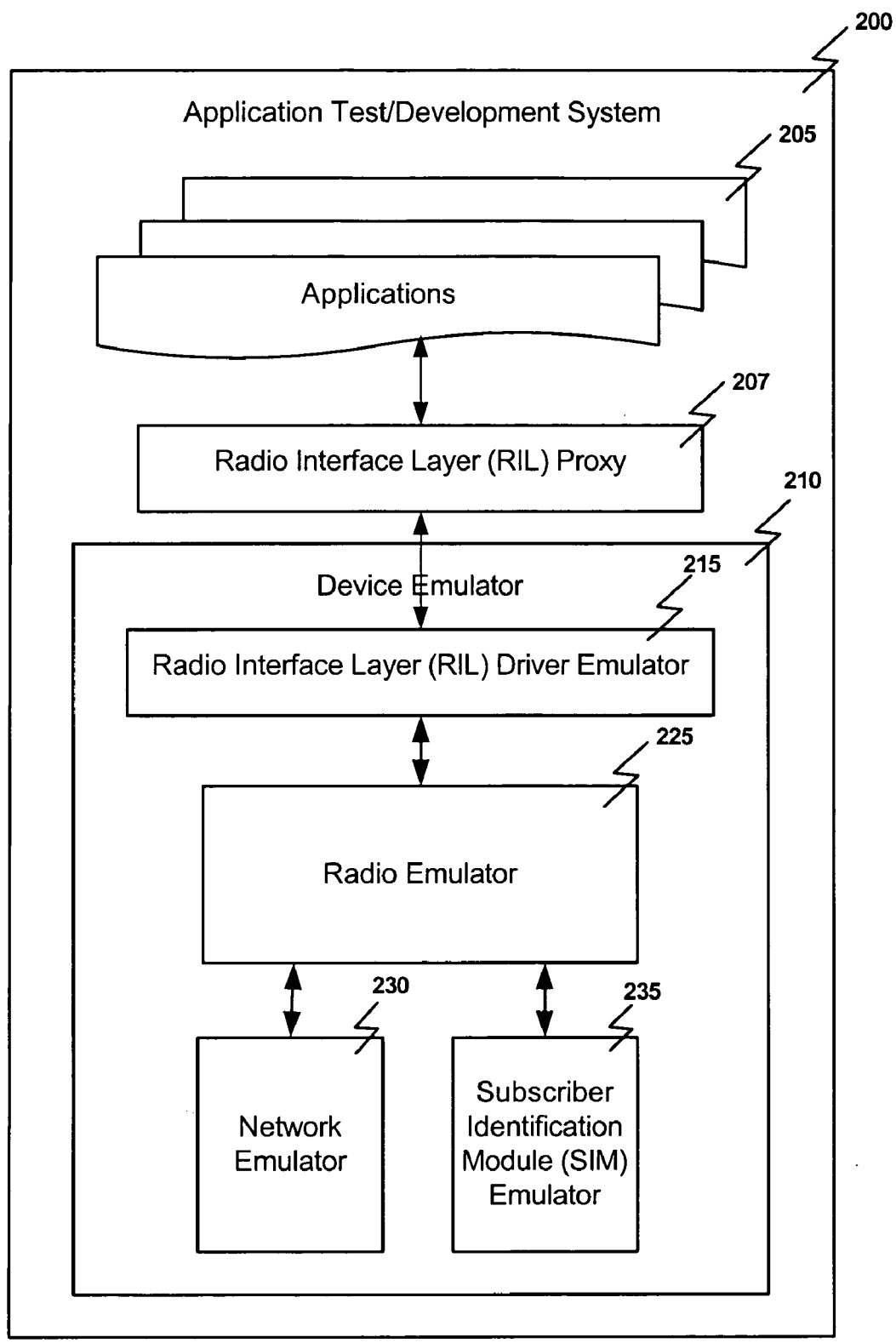
FIG. 2 illustrates functional components of a system for emulating a mobile device on which embodiments of the present invention may be implemented.

FIG. 2 illustrates at a high level the main functional components of a system for emulating a mobile device on which embodiments of the present invention may be implemented. As indicated above, the SIM emulator may be used in an emulated mobile device as well as a real mobile device. One example of an emulated mobile device with which the SIM emulator may be used is described in U.S. patent application Ser. No. (MS304256.01/M&G50037.0199US01) titled "System and Method for Emulating a Telephony Driver" filed on Oct. 23, 2003 which is assigned to the assignee of this application and which is incorporated herein by reference.

The example illustrated in FIG. 2 shows an application test/development system 200 as may be implemented on a computing system such as system 300 described below with reference to FIG. 3. The application test/development system 200 includes one or more applications 205, RIL proxy 207, and a device emulator 210. The device emulator 210 includes a Radio Interface Layer (RIL) emulator 215, a radio emulator 225, a network emulator 230, and a Subscriber Identification Module (SIM) emulator 235.

As above, the applications 205 may include one or more of a variety of possible software applications such as a phonebook, calendar, web browser, etc. These applications 205 are executed by the application test/development system 200 in order to test and debug the applications 205.

During execution, the applications 205 interface with the RIL proxy 207 which in turn interfaces with RIL driver emulator 215 of the device emulator 210. As above, the RIL proxy 207 provides a set of RIL APIs to the applications 205. RIL driver emulator 215, along with the RIL proxy 207, provides for communction between applications 205 and the radio emulator 225. The radio emulator 225, in turn, provides a connection with a network emulator 230 that emulates a wireless network such as a cellular network.

Also, the radio emulator 225 provides a connection between the applications 205 and the SIM emulator 235. As described above, the SIM emulator 235 provides the functionality of a real SIM from the applications and radio points of view. In this manner, the applications 205 may be tested without the cost and trouble of using a real SIM.

Regardless of whether the SIM emulator is connected with an actual mobile device such as mobile device 100 of FIG. 1 or an emulated device such as presented by device emulator 210 of FIG. 2, the functions performed by the SIM emulator are generally the same. Generally, these functions include reading configuration data representing one or more characteristics of the real SIM, initiating execution of the emulation, receiving from a Radio Interface Layer (RIL) a SIM command to access resources of the SIM, handling the SIM command in a manner consistent with operation of the real SIM based on the configuration data, and logging data related to the SIM command and handling of the command. Additional details of these operations will be discussed below with reference to FIGS. 5–7.

Figure 3:
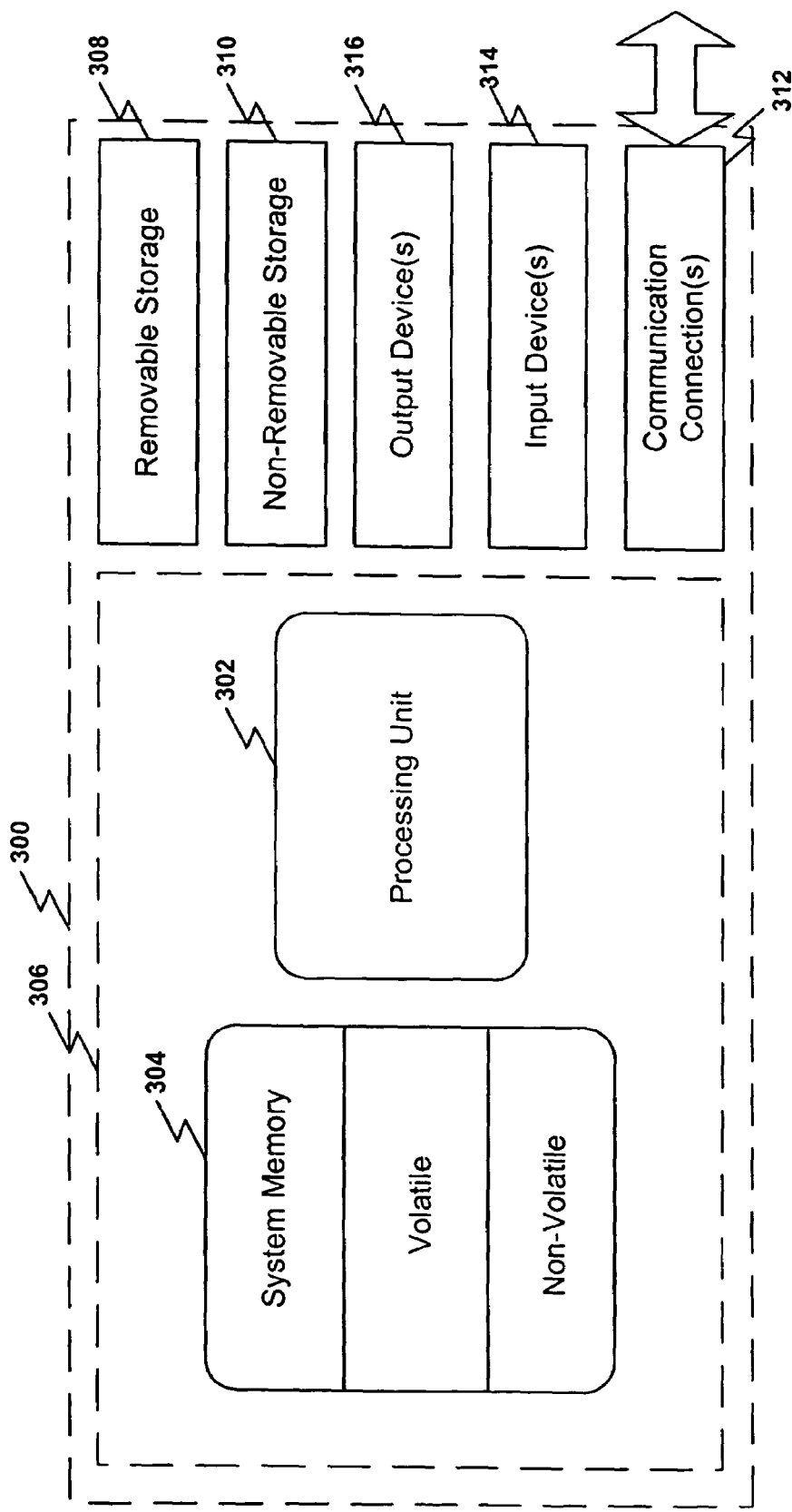
FIG. 3 illustrates an example of a suitable computing system environment on which embodiments of the invention may be implemented.

FIG. 3 illustrates an example of a suitable computing system environment on which embodiments of the invention may be implemented. This system 300 is representative of one that may be used to serve as a redirector and/or servers in a website service. In its most basic configuration, system 300 typically includes at least one processing unit 302 and memory 304. Depending on the exact configuration and type of computing device, memory 304 may be volatile (such as RAM), non-volatile (such as ROM, flash memory, etc.) or some combination of the two. This most basic configuration is illustrated in FIG. 3 by dashed line 306. Additionally, system 300 may also have additional features/functionality. For example, device 300 may also include additional storage (removable and/or non-removable) including, but not limited to, magnetic or optical disks or tape. Such additional storage is illustrated in FIG. 3 by removable storage 308 and non-removable storage 310. Computer storage media includes volatile and nonvolatile, removable and non-removable media implemented in any method or technology for storage of information such as computer readable instructions, data structures, program modules or other data. Memory 304, removable storage 308 and non-removable storage 310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 300. Any such computer storage media may be part of system 300.

System 300 may also contain communications connection(s) 312 that allow the system to communicate with other devices. Communications connection(s) 312 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 300 may also have input device(s) 314 such as keyboard, mouse, pen, voice input device, touch input device, etc. Output device(s) 316 such as a display, speakers, printer, etc. may also be included. All these devices are well know in the art and need not be discussed at length here.

A computing device, such as system 300, typically includes at least some form of computer-readable media. Computer readable media can be any available media that can be accessed by the system 300. By way of example, and not limitation, computer-readable media might comprise computer storage media and communication media.

Figure 4:
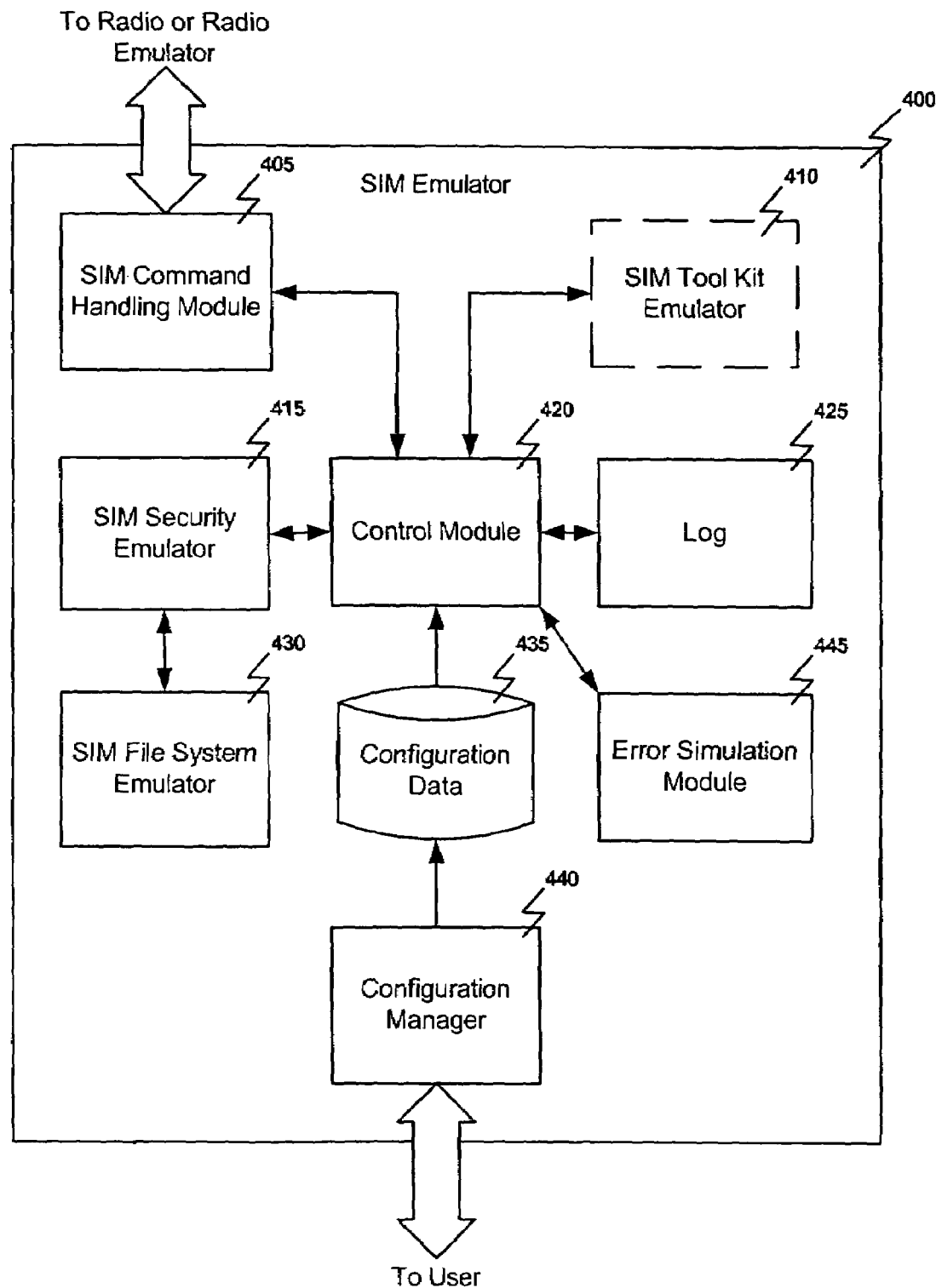
FIG. 4 illustrates functional components of a system for emulating a Subscriber Identification Module (SIM) according to an embodiment of the present invention.

FIG. 4 illustrates the main functional components of a system for emulating a Subscriber Identification Module (SIM) according to one embodiment of the present invention. In this example, the SIM emulator 400 includes a control module 420, configuration data 435, a configuration manager 440, a SIM command handling module 405, a SIM security emulator 415, a SIM file system emulator 430, one or more logs 425, and an optional SIM toolkit emulator 410.

Prior to performing SIM emulation, a user uses the configuration manager 440 to set the configuration data 435. As indicated above, the configuration data 435 may be in the form of an eXtensible Mark-up Language (XML) file, text file, or other format. The configuration data 435 represents one or more characteristics of the real SIM being emulated. For example, the configuration data may comprises one or more parameters representing operating characteristics of a real SIM such as a time delay for performing a function associated with the SIM command. That is, a time lag may be specified per command or per file. In another example, the configuration data may comprise one or more data files such as phonebook entries to be stored in the file system of the SIM.

As will become apparent, the configuration data 435 may be changed or updated during the execution of the emulation. For example, an operator performing a test may change the data to alter the test. Further, SIM commands, such as a write command, that access the configuration data 435 may also alter the configuration data 435 during execution of the emulation.

The control module 420, reads the configuration data 435. The control module 420 uses the configuration data 435 to set up other components of the SIM emulator 400. The control module 420 then initiates execution of the emulation. In some cases, the control module 420 may later, during the execution of the emulation, periodically or in response to some event, read the configuration data 435 and set up other components of the SIM emulator 400 to reflect any changes in the configuration data 435.

During execution of SIM emulation, the SIM command handling module 405 may receive from a radio, either real or emulated, a SIM command to access resources of the SIM emulator 400. For example, the SIM command handling module 405 may receive from the RIL via the radio a SIM command to read or write data in the file system. The SIM command handling module 405 may check the format of the command and any data associated with the command to verify the command before proceeding.

The SIM command handling module 405 then passes the SIM command to the control module 420. The control module 420 may then perform functions based on the command such as error simulation or logging the command and any associated data. The control module 420 will then attempt to access the SIM file system through the SIM security emulator 415.

The SIM security emulator 415 maintains and handles access to files in the file system. Additionally, the SIM security emulator 415 provides access to a Personal Identification Number (PIN) and performs other security functions normally performed by a SIM. Details of handling SIM security commands will be discussed further below with reference to FIG. 7. Generally, the SIM security emulator 415 handles a security command by determining whether access to the SIM security system is authorized for the SIM command. Responsive to determining that access to the SIM security system is authorized for the SIM command, the SIM security emulator 415 performs a function of the SIM security system based on the SIM command and the configuration data 435. The SIM security emulator 415 then determines whether the configuration data 435 indicates a lag time for the SIM command. Responsive to determining that the configuration data 435 indicates a lag time for the SIM command, the SIM security emulator 415 pauses for an amount of time specified in the configuration data 435.

The SIM file system emulator 430 emulates a file system. The SIM file system emulator 430 may include one or more data files containing data from the configuration data 435. For example, the configuration data 435 may include data representing phonebook entries. The control module 420 reads this data from the configuration data 435 and sets up the SIM file system emulator 430 to represent this data in a manner consistent with a real SIM. Details of handling SIM file system commands will be discussed further below with reference to FIG. 6. Generally, handling a file system command comprises determining whether access to the SIM file system is authorized for the SIM command. Responsive to determining that access to the SIM file system is authorized for the SIM command, the SIM file system emulator 430 accesses data in the SIM file system based on the SIM command and the configuration data 435, determines whether the configuration data 435 indicates a lag time for the SIM command, and responsive to determining that the configuration data 435 indicates a lag time for the SIM command, pauses for an amount of time specified in the configuration data 435.

When executing an emulation, the SIM command handling module 405, in cooperation with the SIM security module 415 and the SIM file system emulator 430, handles the SIM command in a manner consistent with operation of a real SIM based on the configuration data 435. For example, handling the SIM command may comprise returning a response code such as a response code that the real SIM would return. The return code may be based on accessing data in the SIM file system. Therefore, handling the SIM command may also comprise returning response data associated with the response code such as data read from the file system in response to successful completion of handling a SIM read command.

The SIM emulator 400 also contains one or more logs 425. The logs 425 may be written to by the control module 420. For example, the control module may record the SIM commands and responses to those commands. In some cases, response data and other data associated with handling the SIM command may also be recorded.

The optional SIM toolkit emulator 410 may provide a SIM toolkit including typical SIM toolkit programs. For example, the toolkit may contain programs that cause messages to be displayed or sounds to be played upon the occurrence of a specified event, testing over-the-air Wireless Application Protocol (WAP) provisioning scenarios, simulating over-the-air software upgrades, or other applications that are normally run on the processor of the real SIM. Generally speaking, the SIM toolkit emulator 410 provides a hook to which the emulated SIM applications being tested may attach. The applications on the mobile device can communicate with the emulated SIM applications at any time via the control module 420 using the appropriate SIM commands. Upon receiving such a SIM command, the control module 420 forwards the command to the SIM toolkit emulator 410. As with other components of the SIM emulator 400, configuration data 435 may be used to specify characteristics of the SIM toolkit such as lag times etc. Additionally, the control module 420 may record SIM commands related to the toolkit in the logs 425 for later retrieval.

Finally, the SIM emulator 400 may also simulate SIM errors based on the configuration data 435. That is, the configuration data 435 may indicate one or more errors to be produced by the control module 420 of the SIM emulator 400 randomly, at specified times, or in response to specified events. Such simulated errors help to more thoroughly test the ability of the application being tested by testing the applications abilities to handle such errors.

Details of error simulation will be discussed below with reference to FIG. 8. Generally speaking, as commands are received from the RIL via the radio, the control module 420 passes that command to the error simulation module 445 which determines whether the given command or the encapsulating class of commands have been stipulated to fail by the configuration data 435. These stipulations may include certain conditions for that failure, such as how many calls should succeed before failing, probability of random failure, lag-time before failure, etc. If the error simulation module 445 determines that the incoming command should fail, it returns the error code specified by the configuration data 435. Example error codes might include SIM not inserted, SIM system failure, etc. The error code is returned from the error simulation module 445 to the control module 420, which then returns that error to the RIL via the radio. The failed command is intercepted by the control module 420 and does not pass through any other modules. Furthermore, the error simulation module 445, based on the configuration data 435 may also autonomously trigger error events such as a SIM removed error, a SIM busy error, etc. Note however that errors can also be generated in other modules such as the SIM file system emulator 430 such as when an application tries to access a nonexistent file, or the SIM security emulator when an application uses an incorrect or unauthorized PIN.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 5:
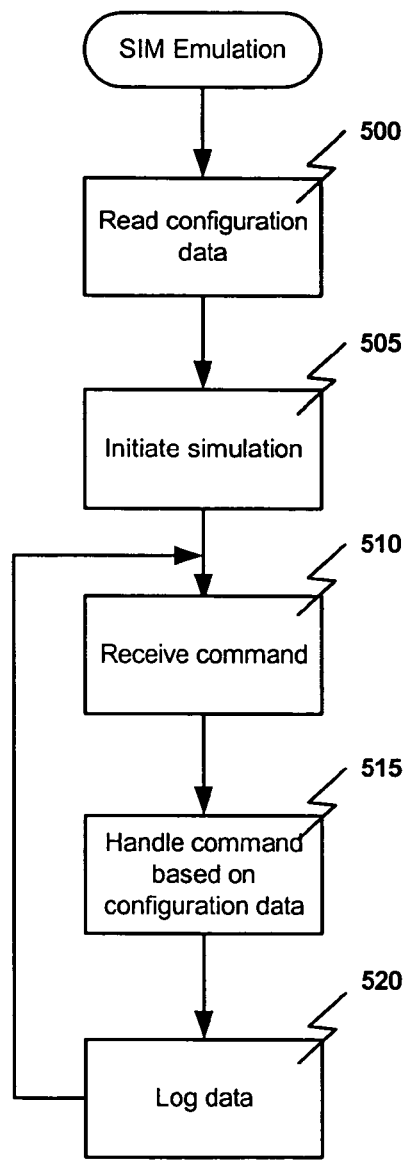
FIG. 5 is a flowchart illustrating SIM emulation according to an embodiment of the present invention.

FIG. 5 is a flowchart illustrating SIM emulation according to one embodiment of the present invention. In this example, operation begins with read operation 500. Read operation 500 comprises reading configuration data representing one or more characteristics of the real SIM. As indicated above, the configuration data may comprise one or more parameters representing operating characteristics of a SIM. One of the one or more parameters for execution of the emulation may comprise a time delay for performing a function associated with the SIM command. Additionally, the configuration data may comprise one or more data files to be stored in a file system of the SIM. The configuration data may be in the form of an XML file, text file, or other convenient format. In other embodiments, the SIM emulator has pre-defined configuration data associated with a real SIM such that no reading operation is required. What is important is that the SIM emulator reads or is encoded with that appropriate configuration data.

Next, initiate operation 505 initiates execution of the emulation. That is, the configuration data is used to set up the SIM emulation so that the emulation will behave in a manner consistent with the real SIM being emulated. For example, variables in the code of the SIM emulator representing characteristics and behaviors that vary between different types of SIMs may be set to values from the configuration data.

At receive operation 510 the SIM emulator receives from a Radio Interface Layer (RIL) via a radio a SIM command to access resources of the SIM. Depending on the nature of the command, receiving the SIM command may further comprise receiving data associated with the SIM command. For example, a write command may have associated data to be written or a pointer to a location to be written. If, at receive operation 510, a SIM command has not yet been received, control may loop or pause at receive operation 510 to wait for a SIM command to be received. In other implementations, other operations may be performed while the SIM emulator is waiting to receive a SIM command. Once a determination is made that a SIM command has been received, control passes to handling operation 515.

Handling operation 515 handles the SIM command in a manner consistent with operation of the real SIM based on the configuration data. The SIM emulator may be hard-coded to respond to some SIM commands in a particular manner. For example, a read command may cause the SIM emulator to respond with a fixed response code along with some data from the file system if the read is successful and a different response code if the read is unsuccessful. Additionally, information in the configuration data used to set up the emulation may indicate operating parameters that vary between different types of SIMs. For example, the configuration data may indicate a lag time to respond to a command or even the format of the response. Additional details of handling SIM commands will be discussed below with reference to FIGS. 6 and 7.

In some embodiments, upon handling a command, a log operation 520 logs data related to the SIM command and handling of the command. Logging data related to the SIM command and handling of the command may comprise recording the SIM command and the response code. Additionally, the response data and other data associated with execution of the emulation and handling of the SIM command may be recorded. As explained above, this data is then available for use in debugging the application being tested.

As mentioned above, the configuration data may change during execution of the emulation. Therefore, in many cases, performing SIM emulation may comprise rereading the configuration data periodically or on the occurrence of some event. In such a case, consistent with the operations outlined above, the SIM emulator will read a second or subsequent set of configuration data and handle subsequent SIM commands in a manner consistent with operation of the SIM based on the second set of configuration data.

Figure 6:
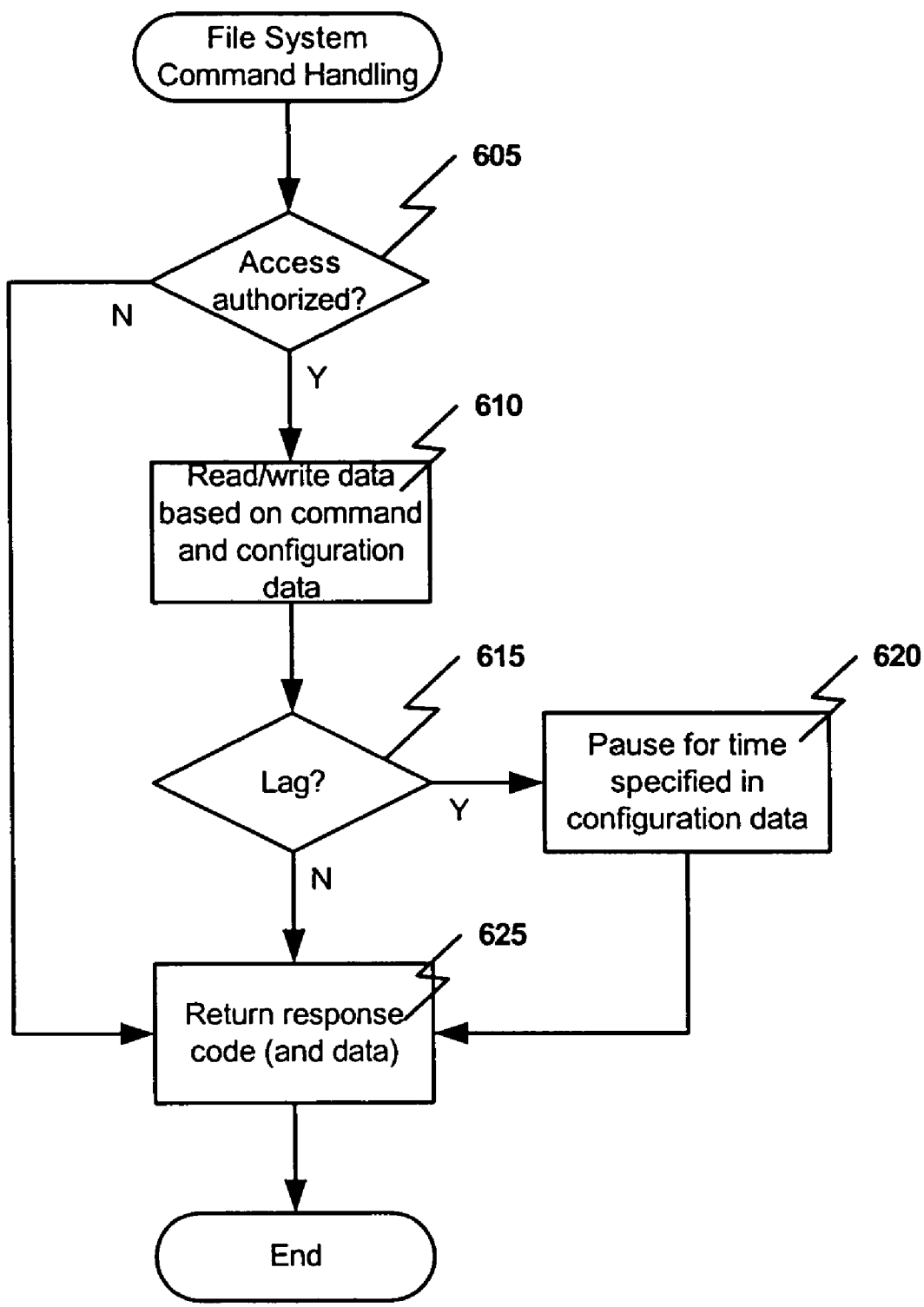
FIG. 6 is a flowchart illustrating SIM file system command handling according to a further embodiment of the SIM emulation illustrated in FIG. 5.

FIG. 6 is a flowchart illustrating SIM file system command handling according to a further embodiment of the SIM emulation illustrated in FIG. 5. The typical SIM file system commands that may be used include, but are not limited to, the standard SIM read and write commands. Here, operation begins with query operation 605. Query operation 605 determines whether access to the SIM file system is authorized for the SIM command. This determination may involve checking a security level of the current application against an Access Control List (ACL) maintained for each file in the file system as in a real SIM. If a determination is made that access is not authorized, control passes to return operation 625. Responsive to determining at query operation 605 that access to the SIM file system is authorized for the SIM command, control passes to read/write operation 610.

Read/write operation 610 comprises accessing data in the SIM file system based on the SIM command and the configuration data. That is, a read command causes the SIM emulator to retrieve data from the file system while a write command causes the SIM emulator to add data to or update the file system.

Next, query operation 615 determines whether the configuration data indicates a lag time for the SIM command. If no lag is indicated in the configuration data, control passes to return operation 625. Responsive to determining that the configuration data indicates a lag time for the SIM command, control passes to pause operation 620. Pause operation 620 comprises pausing for an amount of time specified in the configuration data. Control then passes to return operation 625.

Return operation 625 returns a response code based on accessing data in the SIM file system. For example, a normal SIM response code for a successful write may be returned if SIM emulator completed a successful write. In another example, an attempted read of a file that does not exist may result in an error code being returned. Additionally, in some cases, return operation is 625 may also comprise returning response data associated with the response code. For example, the response code for a successful read operation may be associated with the data read.

Figure 7:
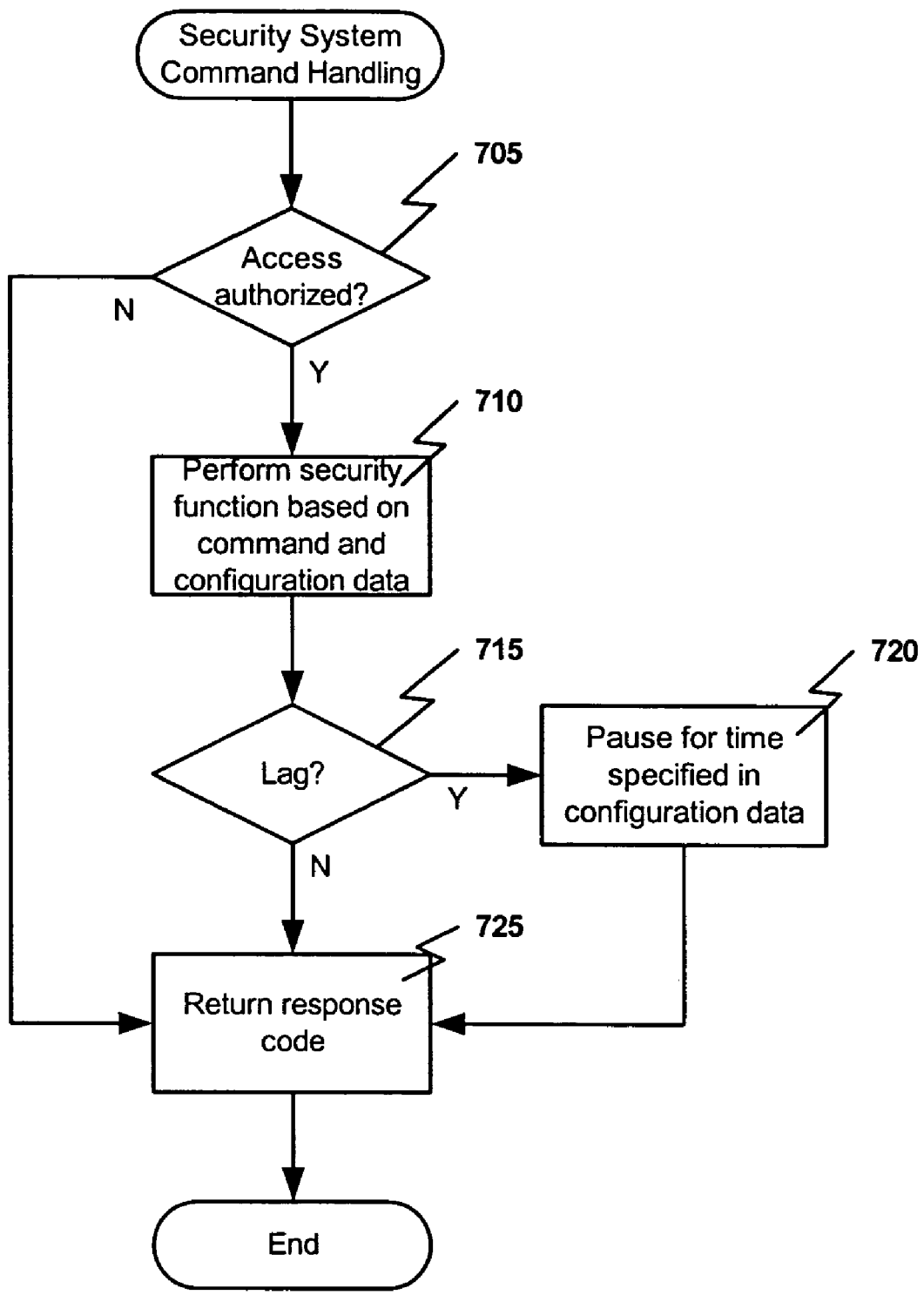
FIG. 7 is a flowchart illustrating SIM security system command handling according to a further embodiment of the SIM emulation illustrated in FIG. 5.

FIG. 7 is a flowchart illustrating SIM security system command handling according to a further embodiment of the SIM emulation illustrated in FIG. 5. SIM security commands that may be used include, but are not limited to, typical SIM commands for verifying, changing, enabling, or disabling the user's Personal Identification Number (PIN). In this example, operation begins with query operation 705. Query operation 705 determines whether access to the SIM security system is authorized for the SIM command. This determination may involve checking a security level of the current application against an Access Control List (ACL) maintained for each file in the file system as in a real SIM. If a determination is made that access is not authorized, control passes to return operation 725. Responsive to determining at query operation 705 that access to the SIM security system is authorized for the SIM command, control passes to execute operation 710.

Execute operation 710 comprises performing a function of the SIM security system based on the SIM command and the configuration data. That is, the PIN may be read, updated, enabled or disabled depending upon the command.

Next, query operation 715 determines whether the configuration data indicates a lag time for the SIM command. If no lag is indicated in the configuration data, control passes to return operation 725. Responsive to determining that the configuration data indicates a lag time for the SIM command, control passes to pause operation 720. Pause operation 720 comprises pausing for an amount of time specified in the configuration data. Control then passes to return operation 725.

Return operation 725 returns a response code based on the success of the operation. For example, a normal SIM response code for a successful PIN change may be returned if SIM emulator completed a successful change. In another example, an unsuccessful access of the PIN may result in an error code being returned. Additionally, in some cases, return operation 725 may also comprise returning response data associated with the response code.

Figure 8:
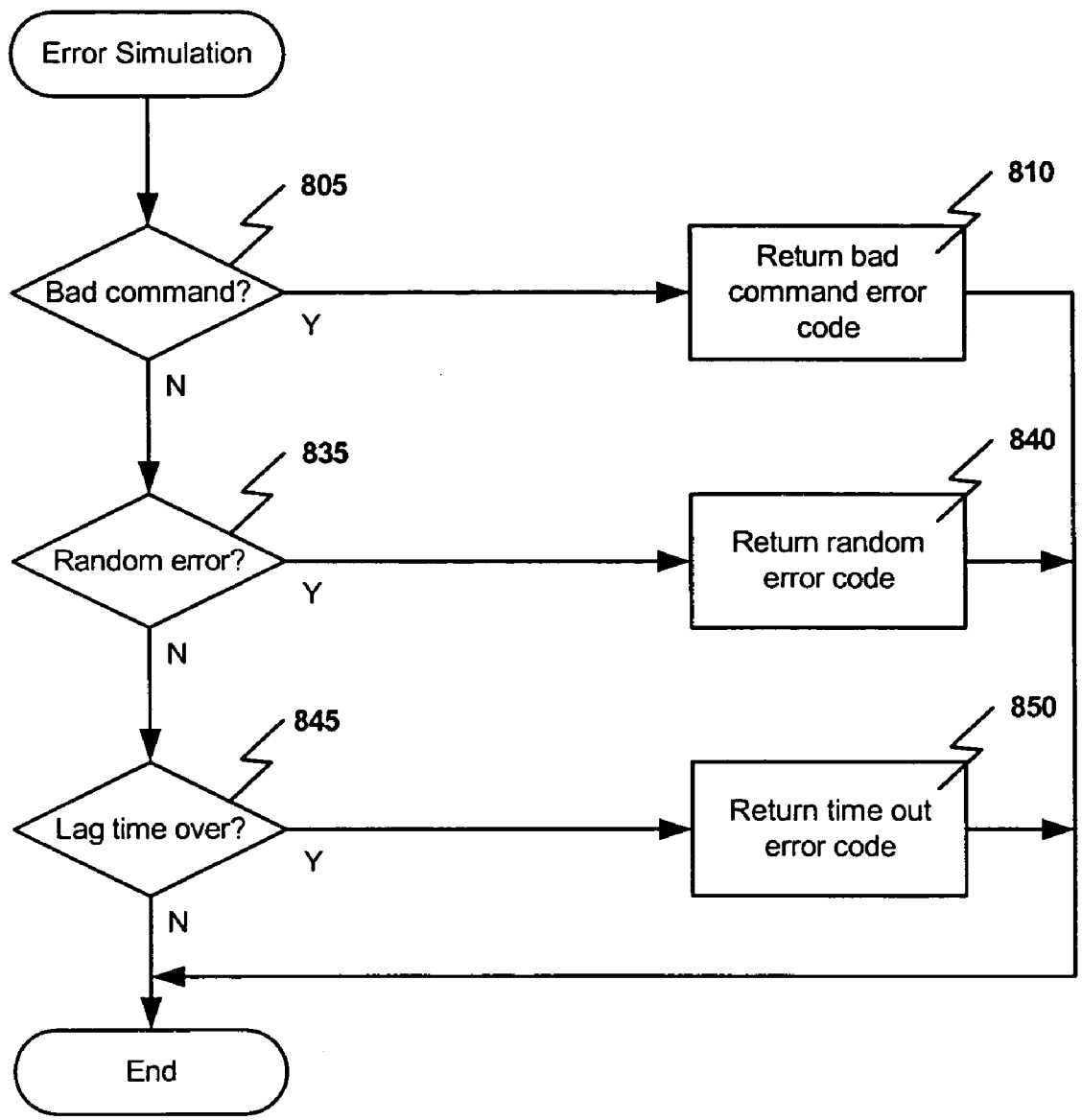
FIG. 8 is a flowchart illustrating error simulation according to an embodiment of the present invention.

FIG. 8 is a flowchart illustrating error simulation according to one embodiment of the present invention. In this example, operation begins with query operation 805. Query operation 805 determines whether the received command should be considered a bad or invalid command. In an embodiment, query operation 805 determines whether a command is "bad" by evaluating the format of the command, one or more parameters associated with the command, or on an. indication in the configuration data that the command or the encapsulating class of commands have been stipulated to fail. If a determination is made that the command should not be considered a bad command, control passes to query operation 835. However, if a determination is made that the command should be considered a bad command, control passes to return operation 810. Return operation 810 comprises returning a bad command error code.

Query operation 835 comprises determining whether a random error should be generated. This determination may be based, for example, on a random number generator for which parameters are stored in the configuration data. If a determination is made that a random error should not be generated, control passes to query operation 845. However, if a determination is made that a random error should be generated, control passes to return operation 840. Return operation 840 comprises returning an error code based on the random error generated. The error code may be one of a number of possible errors stored in the configuration data. Further, the exact error code returned from the number of possible errors may be based on the value generated by the random number generator.

Query operation 845 comprises determining whether a lag time for responding to a received command stored in the configuration data exceeds a limit for that response also stored in the configuration data. That is, a comparison of the command lag time and a limit for the lag time is made. As noted above, the lag time specified in the configuration data may relate to a specific command or to a specific file. If the lag time exceeds the limit, control passes to return operation 850. Return operation 850 comprises returning a time out error.

Although the invention has been described in language specific to computer structural features, methodological acts and by computer readable media, it is to be understood that the invention defined in the appended claims is not necessarily limited to the specific structures, acts or media described. As an example, the SIM emulator may be used in a variety of environments including real devices, emulated devices, or some combination of real and emulated components. Additionally, the configuration data may vary significantly in its format as well as its content. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of emulating a Subscriber Identification Module (SIM) comprising:
   reading configuration data representing one or more characteristics of the SIM;
   initiating execution of the emulation;
   receiving a SIM command to access resources of the SIM;
   handling the SIM command in a manner consistent with operation of the SIM based on the configuration data; and
   logging data related to the SIM command and handling of the command.

2. The method of claim 1, wherein the configuration data comprises one or more parameters representing operating characteristics of a SIM.

3. The method of claim 2, wherein one of the one or more parameters for execution of the emulation comprises a time delay for performing a function associated with the SIM command.

4. The method of claim 1, wherein the configuration data comprises one or more data files to be stored in a file system of the SIM.

5. The method of claim 1, wherein receiving a SIM command further comprises receiving data associated with the SIM command.

6. The method of claim 1, wherein responsive to the SIM command being a command to access a file system of the SIM, handling the command further comprises:
   determining whether access to the SIM file system is authorized for the SIM command; and
   responsive to determining that access to the SIM file system is authorized for the SIM command, accessing data in the SIM file system based on the SIM command and the configuration data, determining whether the configuration data indicates a lag time for the SIM command, and responsive to determining that the configuration data indicates a lag time for the SIM command, pausing for an amount of time specified in the configuration data.

7. The method of claim 1, wherein responsive to the SIM command being a command to access a security system of the SIM, handling the command further comprises:
   determining whether access to the SIM security system is authorized for the SIM command; and
   responsive to determining that access to the SIM security system is authorized for the SIM command, performing a function of the SIM security system based on the SIM command and the configuration data, determining whether the configuration data indicates a lag time for the SIM command, and responsive to determining that the configuration data indicates a lag time for the SIM command, pausing for an amount of time specified in the configuration data.

8. The method of claim 6, further comprising returning a response code based on accessing data in the SIM file system.

9. The method of claim 8, further comprising returning response data associated with the response code.

10. The method of claim 6, further comprising returning a response code based on accessing data in the SIM security system.

11. The method of claim 9, wherein logging data related to the SIM command and handling of the command comprises recording the SIM command, the response code, and the response data.

12. The method of claim 1, further comprising simulating SIM errors based on the configuration data.

13. The method of claim 1, further comprising reading a second set of configuration data and handling subsequent SIM commands in a manner consistent with operation of the SIM based on the second set of configuration data.

14. A system to emulate a Subscriber Identification Module (SIM), the system comprising:
   a processor; and
   a memory coupled with and readable by the processor, the memory containing a sequence of instructions that, when executed by the processor, cause the processor to read configuration data representing one or more characteristics of the SIM, initiate execution of the emulation, receive a SIM command to access resources of the SIM, handle the SIM command in a manner consistent with operation of the SIM based on the configuration data, and log data related to the SIM command and handling of the command.

15. The system of claim 14, wherein the configuration data comprises one or more parameters representing operating characteristics of a SIM.

16. The system of claim 15, wherein one of the one or more parameters for execution of the emulation comprises a time delay for performing a function associated with the SIM command.

17. The system of claim 14, wherein the configuration data comprises one or more data files to be stored in a file system of the SIM.

18. The system of claim 14, wherein receiving a SIM command further comprises receiving data associated with the SIM command.

19. The system of claim 14, wherein responsive to the SIM command being a command to access a file system of the SIM, handling the command further comprises:
   determining whether access to the SIM file system is authorized for the SIM command; and
   responsive to determining that access to the SIM file system is authorized for the SIM command, accessing data in the SIM file system based on the SIM command and the configuration data, determining whether the configuration data indicates a lag time for the SIM command, and responsive to determining that the configuration data indicates a lag time for the SIM command, pausing for an amount of time specified in the configuration data.

20. The system of claim 14, wherein responsive to the SIM command being a command to access a security system of the SIM, handling the command further comprises:
   determining whether access to the SIM security system is authorized for the SIM command; and
   responsive to determining that access to the SIM security system is authorized for the SIM command, performing a function of the SIM security system based on the SIM command and the configuration data, determining whether the configuration data indicates a lag time for the SIM command, and responsive to determining that the configuration data indicates a lag time for the SIM command, pausing for an amount of time specified in the configuration data.

21. The system of claim 19, further comprising returning a response code based on accessing data in the SIM file system.

22. The system of claim 21, further comprising returning response data associated with the response code.

23. The system of claim 19, further comprising returning a response code based on accessing data in the SIM security system.

24. The system of claim 23, wherein logging data related to the SIM command and handling of the command comprises recording the SIM command, the response code, and the response data.

25. The system of claim 14, further comprising simulating SIM errors based on the configuration data.

26. The system of claim 14, further comprising reading a second set of configuration data and handling subsequent SIM commands in a manner consistent with operation of the SIM based on the second set of configuration data.

27. A computer-readable medium encoding a computer program of instructions for executing a computer process for emulating a Subscriber Identification Module (SIM), said computer process comprising:
   reading configuration data representing one or more characteristics of the SIM;
   initiating execution of the emulation;
   receiving a SIM command to access resources of the SIM;
   handling the SIM command in a manner consistent with operation of the SIM based on the configuration data; and
   logging data related to the SIM command and handling of the command.

28. The computer-readable medium of claim 27, wherein the configuration data comprises one or more parameters representing operating characteristics of a SIM.

29. The computer-readable medium of claim 28, wherein one of the one or more parameters for execution of the emulation comprises a time delay for performing a function associated with the SIM command.

30. The computer-readable medium of claim 27, wherein the configuration data comprises one or more data files to be stored in a file system of the SIM.

31. The computer-readable medium of claim 27, wherein receiving a SIM command further comprises receiving data associated with the SIM command.

32. The computer-readable medium of claim 27, wherein responsive to the SIM command being a command to access a file system of the SIM, handling the command further comprises:
  determining whether access to the SIM file system is authorized for the SIM command; and
  responsive to determining that access to the SIM file system is authorized for the SIM command, accessing data in the SIM file system based on the SIM command and the configuration data, determining whether the configuration data indicates a lag time for the SIM command, and responsive to determining that the configuration data indicates a lag time for the SIM command, pausing for an amount of time specified in the configuration data.

33. The computer-readable medium of claim 27, wherein responsive to the SIM command being a command to access a security system of the SIM, handling the command further comprises:
  determining whether access to the SIM security system is authorized for the SIM command; and
  responsive to determining that access to the SIM security system is authorized for the SIM command, performing a function of the SIM security system based on the SIM command and the configuration data, determining whether the configuration data indicates a lag time for the SIM command, and responsive to determining that the configuration data indicates a lag time for the SIM command, pausing for an amount of time specified in the configuration data.

34. The computer-readable medium of claim 32, further comprising returning a response code based on accessing data in the SIM file system.

35. The computer-readable medium of claim 34, further comprising returning response data associated with the response code.

36. The computer-readable medium of claim 32, further comprising returning a response code based on accessing data in the SIM security system.

37. The computer-readable medium of claim 35, wherein logging data related to the SIM command and handling of the command comprises recording the SIM command, the response code, and the response data.

38. The computer-readable medium of claim 27, further comprising simulating SIM errors based on the configuration data.

39. The computer-readable medium of claim 27, further comprising reading a second set of configuration data and handling subsequent SIM commands in a manner consistent with operation of the SIM based on the second set of configuration data.

* * * * *